United States Patent [19]

Servé

[11] Patent Number: 5,348,045

[45] Date of Patent: Sep. 20, 1994

[54] PIPE CLAMP FOR PLASTIC SUPPLY PIPELINES, PARTICULARLY A TAPPING CLAMP

[75] Inventor: Klaus Servé, Radevormwald, Fed. Rep. of Germany

[73] Assignee: Manibs Spezialarmaturen GmbH & Co. KG, Remscheid, Fed. Rep. of Germany

[21] Appl. No.: 137,076

[22] PCT Filed: Feb. 15, 1992

[86] PCT No.: PCT/EP93/00340

§ 371 Date: Oct. 15, 1993

§ 102(e) Date: Oct. 15, 1993

[87] PCT Pub. No.: WO93/16319

PCT Pub. Date: Aug. 19, 1993

[30] Foreign Application Priority Data

Feb. 15, 1992 [DE] Fed. Rep. of Germany ....... 4204620

[51] Int. Cl.⁵ .................... F16K 43/00; F16L 41/06
[52] U.S. Cl. ..................... 137/318; 138/153; 285/197
[58] Field of Search ............ 137/15, 315, 318; 138/153; 285/197, 198, 199

[56] References Cited

U.S. PATENT DOCUMENTS

| | | | |
|---|---|---|---|
| 2,482,687 | 9/1949 | Mueller et al. | 137/318 |
| 2,763,282 | 9/1956 | Reedy et al. | 137/318 |
| 2,839,075 | 6/1958 | Mueller | 137/318 |
| 3,037,521 | 6/1962 | Larry | 251/330 |
| 3,863,937 | 2/1975 | Silverman et al. | 285/197 |
| 3,918,748 | 11/1975 | Acda | 285/197 |
| 3,995,655 | 12/1976 | Sands | 137/318 |
| 4,345,625 | 8/1982 | Mayumi | 138/153 |
| 4,515,177 | 5/1985 | Thalmann et al. | 137/318 |
| 4,655,480 | 4/1987 | Thalmann | 137/318 |
| 4,708,374 | 11/1987 | Cox | 285/197 |

FOREIGN PATENT DOCUMENTS

| | | |
|---|---|---|
| 0173174 | 5/1986 | European Pat. Off. . |
| 3601615 | 3/1987 | Fed. Rep. of Germany ...... 285/197 |
| 8809742 | 10/1988 | Fed. Rep. of Germany . |

*Primary Examiner*—George L. Walton
*Attorney, Agent, or Firm*—Darby & Darby

[57] ABSTRACT

In a pipe clamp for tapping and closing off plastic supply pipelines, the clamp upper shell is constructed from plastic and provided with a one-piece pipe socket. The clamp upper shell can be welded to the desired position of the supply pipeline. In the pipe socket, a coaxial, tubular metal insert, with an internal thread accessible from the interior of the pipe, is provided. To facilitate the handling of the pipe clamp and to strengthen its plastic, it is proposed that the metal insert, although it is constructed in one piece, be organized in two axial sections, different in shape and action. Of these, only the lower axial section is anchored in the pipe socket, while the upper axial section protrudes freely out of the upper front end of the pipe socket and makes the inner thread conveniently available for connecting eligible functional parts.

17 Claims, 7 Drawing Sheets

PIPE CLAMP FOR PLASTIC SUPPLY PIPELINES, PARTICULARLY A TAPPING CLAMP

FIELD OF INVENTION

The invention is directed to a pipe clamp of the type, which is given in the introductory portion of claim 1 and used, in particular, as tapping clamp. A plastic upper shell of the clamp, which is constructed in one piece with a pipe socket or a T-piece pipe, is welded to the desired position in the supply pipeline. The supply pipeline can then be tapped into the interior of the pipe socket and closed.

BACKGROUND INFORMATION AND PRIOR ART

In the case of the known pipe clamp of this type, a tubular metal insert was seated at the pipe inner surface in the pipe socket, which had an internal thread towards the interior of the pipe. This internal thread was used for screwing in functional parts, such as a sleeve-shaped drill, which is in threaded engagement with the metal insert and has, at its lower front end, a cutting edge for severing the pipe wall of the supply pipeline. The handling of the functional parts in the interior of the pipe was cumbersome. The plastic in the region of the pipe socket stretched in the longitudinal direction when stressed and was able to flow away. Moreover, the connection of the metal insert to the pipe socket was in danger of breaking.

OBJECT OF THE INVENTION

It is an object of the invention to provide an attractively priced pipe clamp of the type described in the introductory portion of claim 1, which is convenient to handle and is distinguished by its high dimensional stability and by its strength. Pursuant to the invention, this is achieved by measures listed in the characterizing part of claim 1, to which the following special importance is attached.

SUMMARY OF THE INVENTION

As metal insert, the invention uses a special, one-piece construction, which is organized in two axial sections, different in shape and action, of which the lower axial section is referred to hereinafter in short as "foot section" and the upper axial section as "head section". Whereas the foot section is firmly anchored in the pipe socket, the head section freely protrudes out of the upper front end of the pipe socket and carries the internal thread. The internal thread now precedes the plastic pipe socket and therefore is conveniently accessible for handling the functional parts connected thereto. The head section is supported at the upper front end of the pipe socket and can therefore transfer the forces, which arise in its region as a result of the handling, well to the pipe socket that follows, in which the foot section, which is in one piece therewith, is integrated. Because the internal thread of the pipe socket now precedes, the foot section can be embedded fully in the plastic material in the pipe wall. The foot section positively engages the plastic of the pipe socket. With this, the foot section fulfills the function of a reinforcing sleeve, which braces the pipe socket. This positiveness is promoted by radial openings in the foot section, which the plastic of the pipe socket infiltrates and therefore provides for an intimate connection between the two-membered metal insert and the pipe socket. A material composite exists, which can be highly stressed and withstands axial, radial or tangential forces, which act on the head section of the metal insert, when said insert is used in the intended manner.

This is particularly important, if the pipe clamp is constructed as a so called "T-piece pipe", which has a lateral pipe junction for branching off a house connection line, which can be connected thereto. The T-piece pipe is constructed of plastic in one piece with the upper clamp shell and has in its upper region the pipe socket. The special, inventive, two-membered metal insert is integrated in this T-piece pipe in the manner mentioned. Its head section protrudes out of the upper end of the T-piece pipe, while its foot section extends as reinforcing sleeve over the whole length of the T-piece pipe. Suitable radial openings are disposed above as well as below the pipe junction. The T-piece pipe is reinforced continuously. The plastic in the region of the T-piece pipe is held dimensionally stably by the reinforcing sleeve and does not flow away. At the transition into the upper clamp shell, the inventive pipe clamp has radial projections, such as an internal collar. Such an internal collar can serve to form or at least reinforce a valve seat in the T-piece pipe, when the invention serves as a valve tapping shell.

It is of independent inventive importance to assign a plastic covering cap to the pipe clamp. Said plastic covering cap encapsulates the regions of the there installed functional parts protruding out of the pipe socket, covers with its edge zone surrounding the cap opening the circumferential region of the pipe socket and is welded on there. By means of this encapsulation, ideal corrosion protection is achieved. The cumbersome setting of a heat-shrinkable sleeve becomes unnecessary. For functional parts, which ultimately can remain in the pipe socket or in the T-piece pipe, such as valve-drill facilities with milling cutter, the plastic covering cap is inverted already by the manufacturer over the functional part set in the pipe clamp and welded to its pipe socket or T-piece pipe. This facilitates the handling of the pipe clamp for the customer. In all other cases, this is done by the customer, after the ultimate functional part, such as a valve element or a plug, has been set.

In the crown region, the covering cap can be provided with an axial opening, which produces a terminal opening in the crown region. The operating end of a functional part, such as a rotating handle of a valve element, a tapping element or the like, set in the interior of the pipe socket or the T-piece pipe, is then passed through such a terminal opening. The covering cap gains special importance if the aforementioned two-membered metal insert, which is cited in claim 1, is used for a pipe clamp. In this case, the middle zone of the covering cap encases the head section protruding at the front end of the pipe socket or the T-piece pipe, while the aforementioned edge zone of the cap is welded first in the adjoining circumferential region, where the foot section runs as reinforcing sleeve in the adjoining pipe socket or T-piece pipe.

Further measures and advantages of the invention arise out of the dependent claims, the specifications and the drawings. Several embodiments of the invention are shown in the drawings, in which

Figure 7:
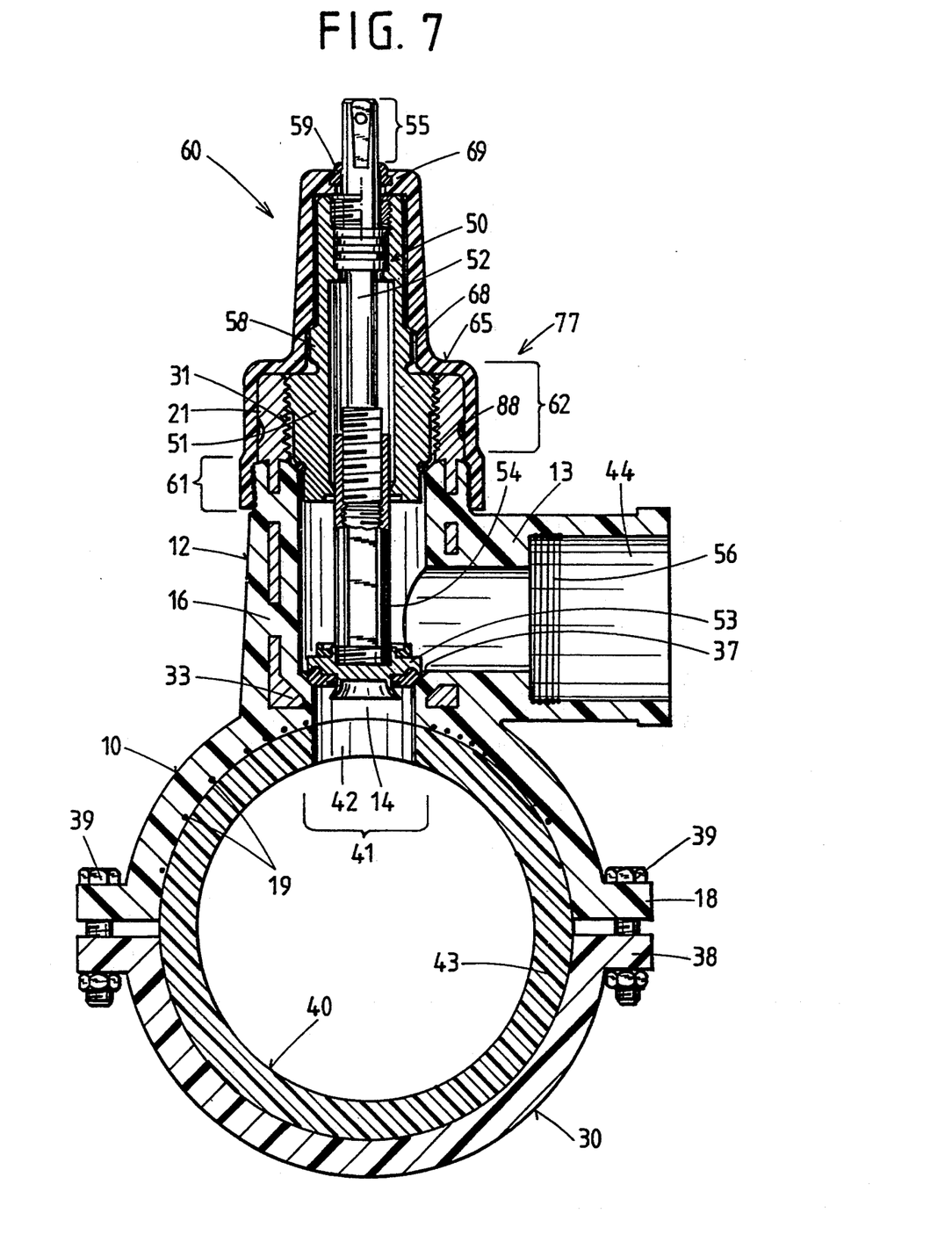
FIG. 7 shows, in an axial section corresponding to FIG. 4, the complete pipe clamp, which is connected to a supply pipe line, with a valve element installed therein, as well as with covering cap of FIG. 5 fastened thereto, FIGS. 8 and 9, in a representation corresponding to that of FIG. 4, show two further, alternative embodiments of the upper region of an inventive pipe clamp.

The inventive pipe clamp consists of a plastic clamp upper shell 70, as well as of a lower shell 30, which advisably also consists of plastic, which, as can be seen from FIG. 7, are to be rigidly installed at a desired position 41 on a plastic supply pipeline 40. The plastic supply pipeline 40 serves for conducting media under an elevated pressure, such as gas, water, etc. In practice, the need now arises to provide pipeline connections subsequently at this position 41 to the supply pipeline 40, which has already been installed and which is under the pressure of the medium. The pipeline wall 43 must then be provided at this position 41 with a borehole 42, against which the functional parts required for the drilling can be seated and which permits the borehole 42 to be closed off medium-tight no later than after the ultimate functional part is seated. This task is assumed by the inventive tapping clamp, which, as valve tapping clamp 77, is constructed in the following, special manner, which can be seen in FIGS. 1 to 7.

The plastic upper shell 10 is provided here in one piece with a T-piece pipe 12, which has a lateral pipe junction 13. Above this pipe junction 13, the T-piece pipe runs on in a short pipe socket 11. The T-piece pipe 12 ends with a central borehole 14 at the inner surface 15 of the upper shell 10 of the clamp. In the pipe socket 12, a special tubular metal insert 20 is integrated, the structure of which can be seen in FIGS. 1 through 3.

The metal insert 20 consists of two axial sections, which differ in shape and have mutually different wall pieces 23, 24. These axial sections, 21, 22 differ also in their action, as shown by their installation in FIG. 4. The lower axial section 22, equipped with a thin wall thickness 24, is integrated, as can be seen in FIG. 4, in the plastic 16 of the T-piece pipe 12, for which reason it should be referred to with the name "foot section" already mentioned above. On the other hand, the other axial section 21 protrudes axially from the end region of the T-piece 12 determined by the pipe socket 11, for which reason the also already mentioned name of "head section" is to be used for it. The head section 21 is provided with a significantly thicker wall thickness 23, which advisably, can be seen from FIG. 1, forms a shoulder with respect to the inner surface as well as the outer surface of the thin wall 24 of the foot section 22. As a result, a shoulder 27 is formed at the transition between the head section 21 and the foot section 22. As can be seen from FIG. 4, said shoulder 27 in the finished pipe clamp is braced at the free front end 17 of the pipe socket 11 there.

The foot section 22 is embedded in the midst of the plastic 66 of the T-piece pipe 12 and extends over the whole length of said T-piece. The foot section 22 furthermore has several radial openings 28, which are infiltrated in the finished pipe clamp by the plastic 16 of the T-piece pipe 12, as can be seen from FIG. 4. The radial openings 28 are disposed group-wise in two axial zones 25, 26, which are spaced apart by a defined height 35. As shown by a comparison with FIG. 4, the radial openings 28 in the upper axial zone 25 are essentially level with the terminal pipe socket 11 above the diverging pipe junction 13, while the radial openings 28 of the lower axial zone 25 are disposed level with the pipe junction 13. According to FIGS. 1 and 3, there is in this lower axial zone 26 also a radial opening 29, with an opening diameter exceeding the clear width of the pipe junction 13. The radial opening 29 surrounds the shoulder of the pipe junction 13 at the T-piece pipe 12, as can be seen from FIG. 4. The radial opening 29 and the radial openings 28 of the lower axial zone can even be positioned at exactly the same height. Out of this arises the special function of the foot section 22 of serving as a reinforcing sleeve of the T-piece pipe 12, which is positively engaged with it all around.

After the foot section 22 is imbedded in the plastic 16 of the T-piece pipe 12, the thick-walled, axially protruding head section 21 of the two-membered metal insert 20 serves to connect any functional parts which permit the pipe clamp to become a component of a pipe fitting. In the embodiment of FIG. 7, this is a valve element 50. For this purpose, the head section 21 has an internal thread 31. On the circumferential surface of the head section 21, possibilities are provided for connecting transfer tube equipment or the like, for which radial coupling mountings 32 are provided in the present case. As is evident from FIG. 4, these lie free in the finished composite of metal insert 20 and T-piece pipe 12. In this connection, there can also be alternative constructions, which will be described in greater detail later on in conjunction with FIGS. 8 and 9.

The valve tapping clamp 77 of FIG. 7 is assembled from its upper shell 10 and lower shell 30. For this purpose, the lower shell 10 and the upper shell 30 have edge flanges 18, 38 with leadthroughs for clamping screws 39 or the like. As can be seen from the internal view in FIG. 6 of the upper shell 10, a special heat conductor 19, which serves for connecting the installed upper shell 10 to the supply pipe line 40 by welding, is disposed at the inner surface 15 of the shell. The heat conductor is constructed here as a heat spiral 19 and placed in numerous spiral windings 49 around the aforementioned central borehole 14 for the T-piece pipe 12. The two ends 47, 48 of the pipeline run radially to the spiral and end at two electrical contact sites 46. Said contact sites 46 are at mutually opposite cylinder ends 45 of the upper shell 10 and therefore are accessible for particularly convenient handling. Due to the spiral course 49 of the heat conductor 19, the warming takes place along those lines, which are responsible for a medium-tight connection of the transition region between the central borehole 14 on the clamp side on the one hand and the borehole 42 in the pipeline wall 43 of the supply pipeline 40 of FIG. 7 on the other. The pipe clamp, so installed as shown in FIG. 7, is prepared to be equipped alternately with the required functional parts.

Due to the special, inventive bond between the metal insert 20 and the T-piece pipe 12, the inventive upper shell 10 gains an appearance in the region of the head section 21 similar to that known for a conventional, metallic T-piece pipe, which is fastened by a welded connection to a metallic pipe of a supply pipeline. Therefore those functional parts, which have previously been known in the case of metallic T-piece pipes, can be used in a known manner at the head section 21. For example, it is possible to set the already mentioned transfer tube equipment, on which drilling equipment, bubble seating equipment for closing the supply pipeline 40, valve setting equipment or stopper equipment can be mounted, in the circumferential region of the head section 21. For this purpose, the aforementioned coupling mounting 32 is used in the present case. If the coupling mounting 32 is used, the head section 21 can also be used for directly attaching drilling equipment. This will be described later in greater detail in conjunction with FIG. 10. No matter which procedure is used, the borehole 42 is cut first in the pipeline wall 43 in the interior of the set tapping clamp 77. After that, a final functional part, namely the already mentioned valve element 50 in the case of FIG. 7, the valve upper part 51 of which encircles an external thread section, is set in the internal thread 31 of the head section 21, which is still freely accessible. The collar-like thread section of the valve upper part 51 is braced over a sealing ring 88 at an inner shoulder 79 at the front end 17 of the pipe socket 11 at the end side, as shown in FIG. 4. In the valve upper part 51, a valve spindle 52, sealed by conventional sealing rings, and a valve stem 54 having a valve disk 53 are disposed. The valve spindle 52 protrudes with its turning handle 55 out of the valve upper part that has been screwed in. The composite of metal insert 20 and the T-piece pipe 12 serves in the present case as a valve housing. For this purpose, the integrated foot section 22 is shaped by the metal insert in a particular manner.

Figure 1:
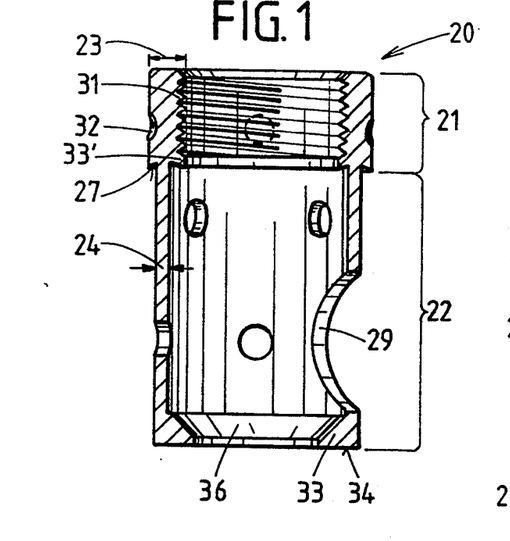
FIGS. 1, 2 and 3 show a longitudinal section, a side view and a partially broken off plan view of a first embodiment of a metal insert, jointed in two sections, for a first version of an inventive pipe clamp.
Figures 2, 4:
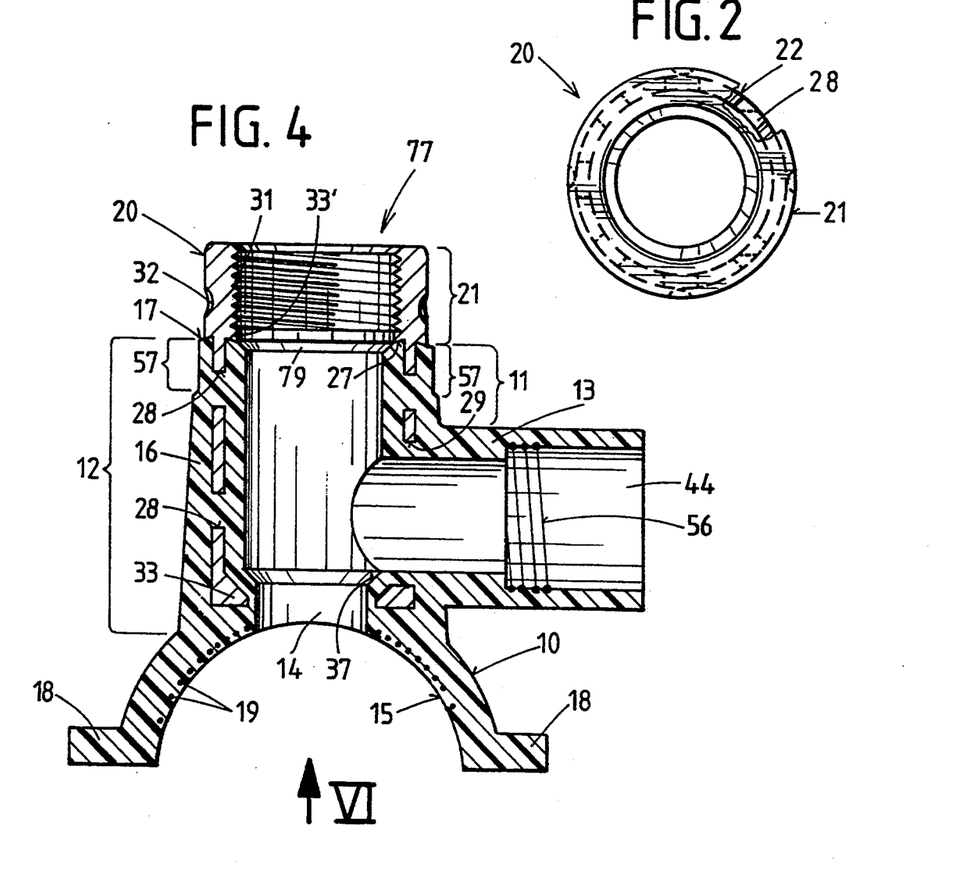
FIG. 4 shows, in a longitudinal section corresponding to FIG. 1, the upper region of a first embodiment of the inventive pipe clamp, which is constructed as a T-piece pipe and is equipped with the metal insert of FIGS. 1 to 3.
Figure 3:
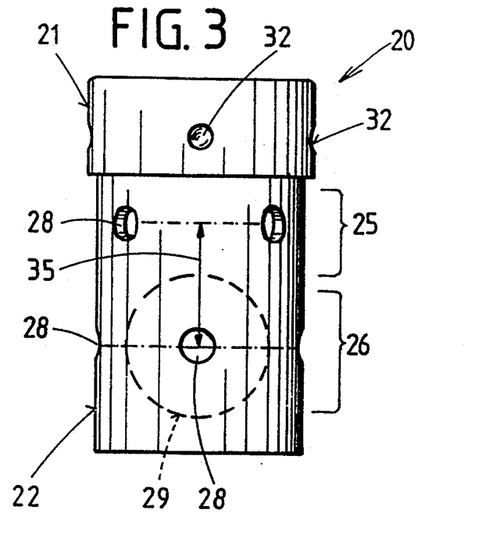

In the present case, as can be seen from FIG. 1, the foot section 22 has an inwardly pointing radial projection, which has a uniform ring-shaped profile and thereby produces an interruption-free internal collar 33. Said collar 33 here is at the inner end 34 of the foot section 22, which lies opposite the head section 21 and produces a conical inner 36 surface. In the finished composite, the internal collar 33 is at the site of the transition of the T-piece pipe 12 to its upper shell 10 and, moreover, in that particular region, where the plastic masses 16, forming the interior of the piece of pipe, produce a valve seat 37 for the valve disk 53 recognizable from FIG. 7. By operating the turning handle 55, the valve disk 53, as a result of the ejection of the valve shaft 52 from the valve spindle 54, is screwed axially downwards and bumps into the valve seat 37, which is reinforced significantly by the internal collar 33. The aforementioned internal cone 36 of the internal collar 33 supports the corresponding conical profile of the valve seat 37. Instead of an internal collar, other radial projections, which can also, if necessary, be directed to the outside, can be provided in the foot section 22. Such radial projections need not have a circular shape, but can also produce an irregular circumferential profile in the form of teeth, etc. This would be necessary for embedding the foot section 22 in the plastic 16 of the T-piece pipe 12.

As already mentioned, the pipe junction 13 of the T-piece pipe 12 serves for installing a house-connection pipeline, the details of which are not shown. For this purpose, the pipe junction 13 is constructed in the end region as coupling sleeve 44, in the interior of which an electrical heating conductor 56 is disposed, which takes care of a welded connection. Other connection possibilities are also conceivable. The tapping T-piece, equipped with the valve element 50 as shown in FIG. 7, can also be encapsulated in a special manner.

Figure 5:
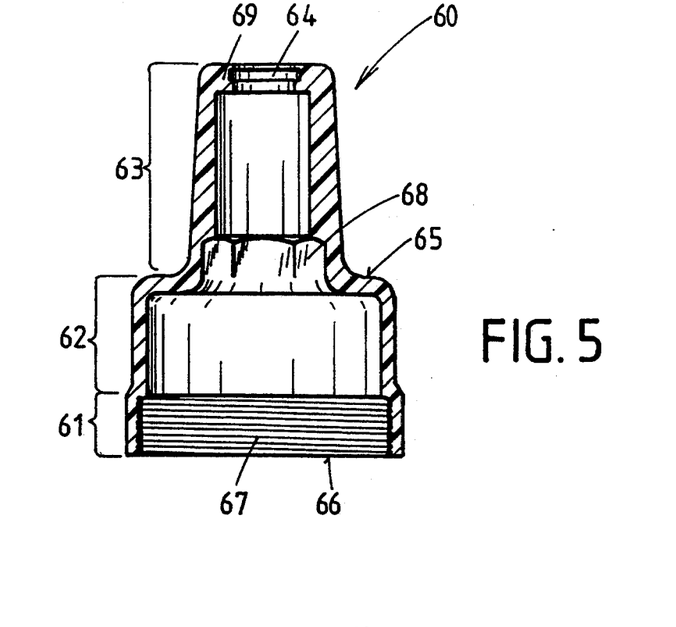
FIG. 5 shows a longitudinal section of a covering cap for the pipe clamp of FIG. 4.
Figure 6:
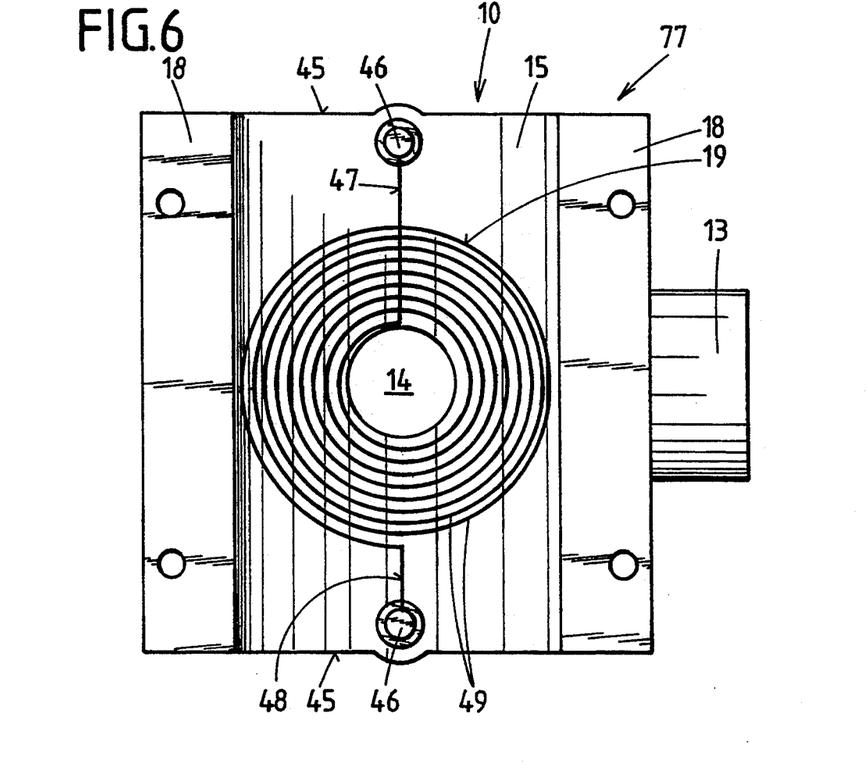
FIG. 6 shows a view from below of the upper shell of the clamp shown in FIG. 4.

For the encapsulation, the special covering cap 60 shown in FIG. 5 is used. The covering cap 60 consists of plastic and is constructed to be rotationally symmetrical as seen from the outside, but has stepped sections on the inside. The covering cap 60 has the greatest clear width at its edge zone 61 encircling the hood opening 66 and is provided at the interior surface with a heating coil 67. This cap edge zone 61 has a clear width, which is made to fit the upper circumferential region 57 of the pipe socket 11 belonging to the T-piece pipe 12 and therefore experiences there the welded connection shown in FIG. 7. The effectiveness of the heating coil 67 can be realized with the same equipment and, if necessary, at the same time as the welded connection in the region of the heating coil 56 in the region of the pipe junction 13 and/or of the heating coil 19 in the region of the upper shell 10. The circumferential region 57 at the pipe socket 11, relevant for the welding and shown in FIG. 4, directly adjoins the protruding head section 21 of the metal insert 20 and is offset with respect to the T-piece pipe by a suitable external longitudinal profile. This circumferential region 57 could be given a special preparation for welding purposes.

Adjoining the weldable cap edge zone 61, there is a stepped cap middle zone 62, which changes over, by way of a step 65, into a cap cone 63. During an installation, as shown in FIG. 7, the hood middle zone 62 encases the peripheral surface of the head section 21 and the step 65 comes to lie in front of the free front end of the head section 21. The collar-shaped threaded section of the valve upper part 51, which grips the shoulder of the step 65 from behind, also ends at this place. The cap cone 63 encloses the offset region of the valve upper part 51 and has, at the site of the transition to the step 65, a noncircular seat 68, which has the negative shape of a hexagonal profile of a nut and is shown in FIG. 5. For the installation shown in FIG. 7, the valve upper part 51 comes to lie with the positive shape of its nut-shaped hexagonal handle 58 in this region. As a result, the valve upper part 51 is positively engaged with the covering cap 60, so that the handle 58 in the hexagonal profile 68 sees to it that the valve element 50 in the T-piece pipe 12 is held so that it cannot rotate. With its apical region, the cap cone 63 grips behind the front end of the valve upper part 51 and has an axial opening 64 there, which can be seen in FIG. 5 and produces a terminal stop plug 69 there. The axial opening produces a terminal orifice 64, through which the rotating handle 65 protrudes during the installation shown in FIG. 7. The interior of the orifice 64 is profiled and serves to accommodate a conical sealing ring 59, which is placed around the rotating handle 55 to form a media-tight seal.

Figure 8:
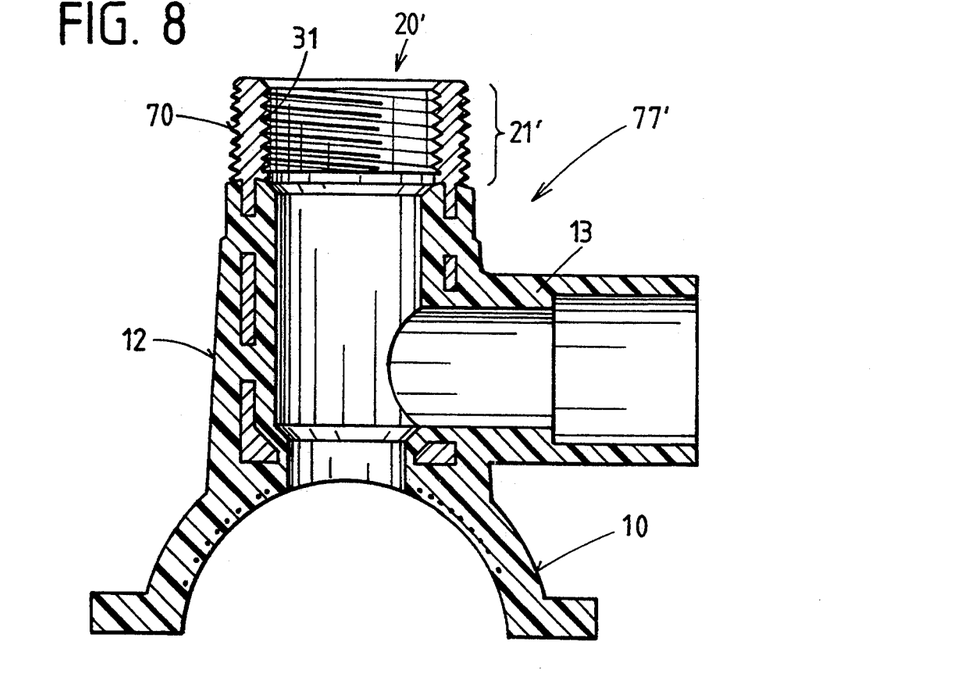
Figure 9:
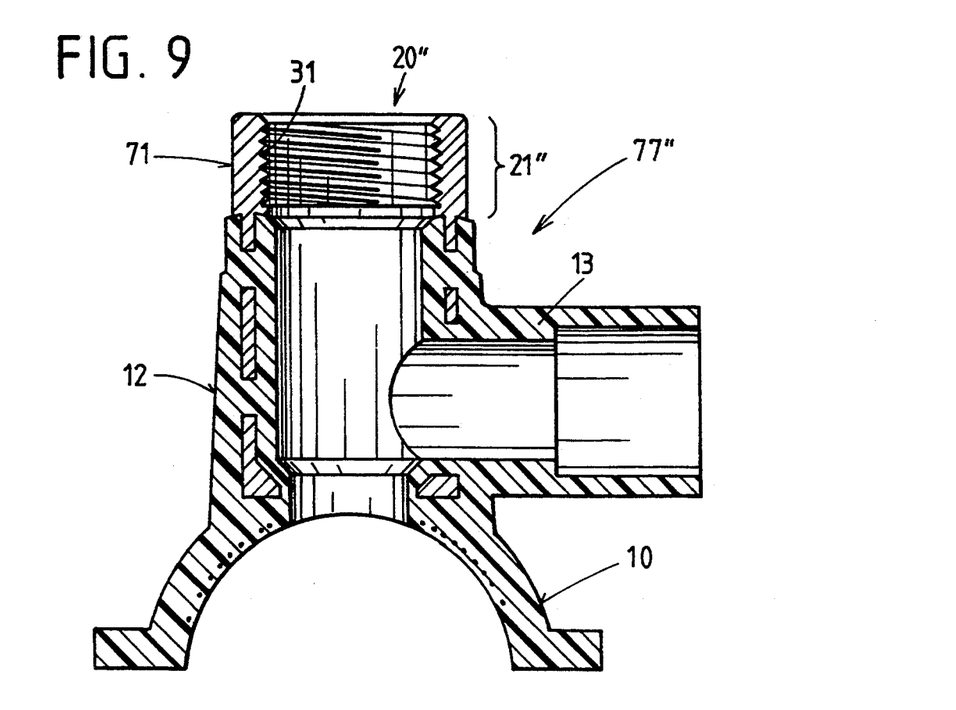

In FIGS. 8 and 9, two alternative embodiments of the upper part of a valve-tapping clamp 77' and 77'', which have a metal insert 20' or 20''in the T-piece pipe 12 that is modified from the one shown in FIG. 4, is shown in an axial section corresponding to that of FIG. 4. It is sufficient to consider only the differences of these metal inserts 20', 20'', because the previous description holds good in other respects. The differences consist mainly of a different construction of the axially protruding head section 21', 21''.

In the case of FIG. 8, the head section 21' is provided at its circumferential surface with an external thread 70, which serves instead of the radial openings 29 described in FIG. 4 for connecting other functional parts, such as drilling equipment, a transfer tube that can be closed off, or the like. In the case of FIG. 9, the corresponding exposed head section 21'' of the metal insert 20'' there is provided with a smooth peripheral surface 71. Such an upper shell 10, equipped with the T-piece pipe 12, is the upper part of a valve-drilling clamp 77', 77'', which is used, for example, for installing a tapping element 72, shown in FIG. 10. For naming the various components of valve drilling element 72 installed in the valve drilling clamp 77'' in FIG. 10, reference numbers have been used, which are the same as those of the valve element 50 in FIG. 7, for which reason the previous description applies in this respect. It is sufficient to discuss only the differences.

Figure 10:
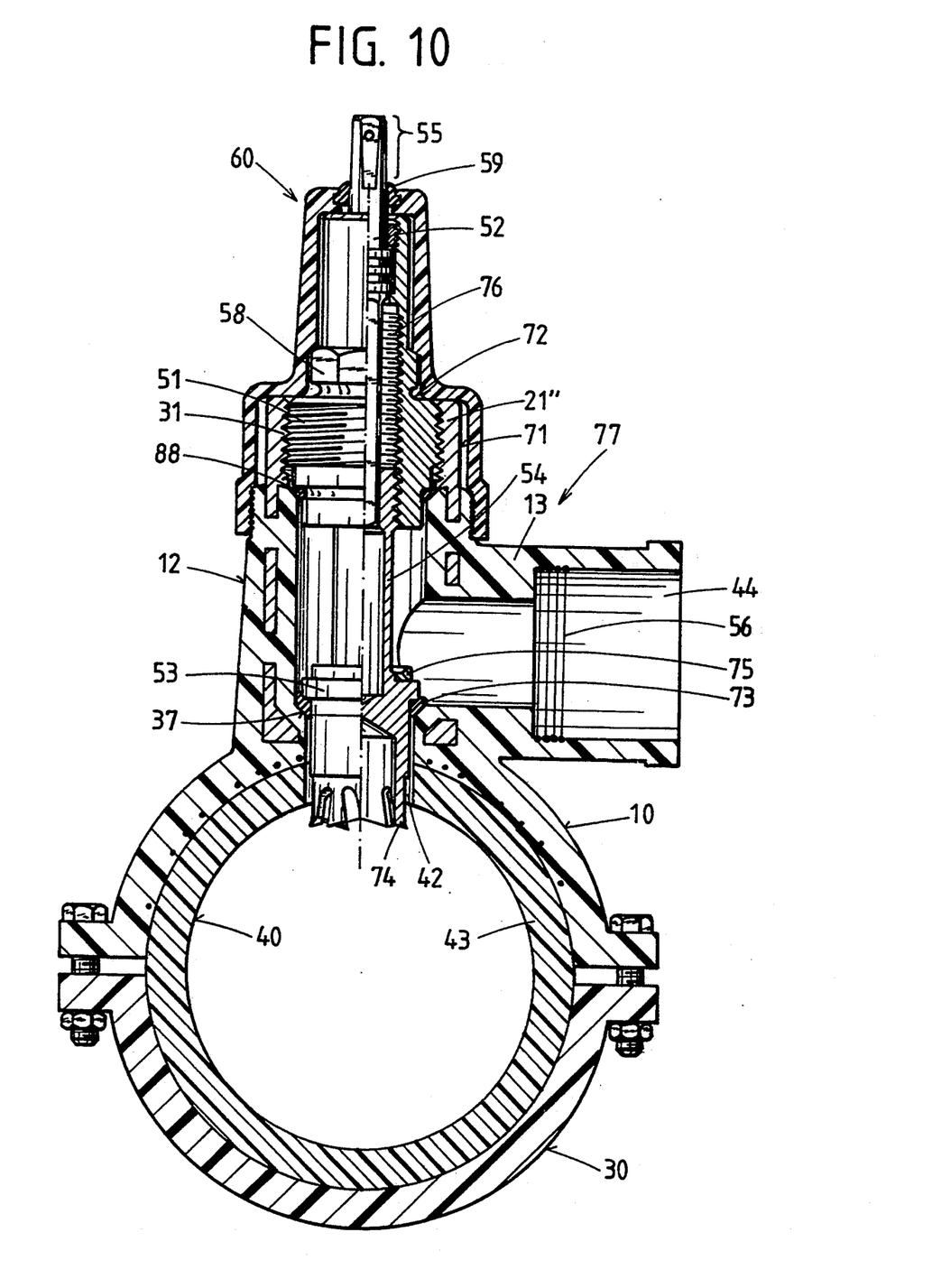
FIG. 10 shows a complete pipe clamp, which is provided with the component of FIG. 9 and in the T-piece pipe of which, on the one hand, valve-drilling equipment is seated and, on the other, the covering cap of FIG. 5 is fastened, FIGS. 11 and 12, in a longitudinal section, show two further embodiments of a two-membered metal insert for a further modified embodiment of an inventive pipe clamp.

The valve drilling element 72 is already screwed by the manufacturer with its valve upper part 51 into the internal thread 19 of the head section 21''. The valve spindle 52 carries not only the valve disk 73, but is provided below its lower valve seal 73 with a one-piece milling cutter 74. When the valve tapping clamp of FIG. 10 is delivered, the installed valve tapping element 72 is already enclosed in the factory by means of the previously described covering cap 60. The valve tapping clamp 77'', designed pursuant to the invention, and the tapping element 72, together with the covering cap 60, form a pre-assembled structural unit, which forms a product brought unto the market by the manufacturer. The gripping from behind and the safety mechanisms to prevent rotation between the repeatedly stepped covering cap 60 and the valve upper part 51, already described in conjunction with FIG. 7, result. The milling cutter 75 on the valve disk 53 is then, however, initially in an upper screw position, which is opposite to that shown in FIG. 6 and in which the upper disk seal 75 lies against the inner front surface of the valve upper part 51. The upper end of the valve shaft 54 is in engagement with an internal thread 76, which is in the valve upper part 51 here and has a slight slope, in order to make manual tapping possible. By rotating the also sealed handle 55 of the spindle 52 protruding from the cap, the milling cutter 40 is moved against the upper shell 10 the and lower shell 30, which are fastened to the connecting pipeline 40. By these means, the milling cutter 74 itself cuts the borehole 42 in the wall 43 of the pipeline. FIG. 10 shows the other screw position, in which finally the lower disk seal 73 on the valve shaft 54 is caused to lie against the already described valve seat 37 forming a seal. The pipe junction 13 is blocked. Through the use of the already described heat conductor 56, which is provided in the coupling sleeve 44 there, a house connection pipeline can be connected. By turning the handle 55, the valve disk 53 can then be lifted from its seat 37. With its nut profile 68, already described in connection with FIG. 5, the covering cap 60 embraces the hexagonal handle 58, which is molded in one piece with the valve upper part 51, and absorbs torques, which prevent the unwanted screwing of the whole valve tapping element 72 out of the T-piece pipe 12.

In FIGS. 11 to 16, a tapping clamp 80, 80' is shown in two embodiments with its different components, which are designed similarly to the above-described valve tapping clamp 77, 77', 77'' of the aforementioned Figure and are suitable not for seating house connection pipelines, but instead for seating bubble pistons or plungers in the supply pipeline 40 and for blocking off the supply pipeline 40. Admittedly, the components of the tapping clamp 80, 80' are modified with respect to the previously described valve tapping clamp 77 to 77''. However, the same reference numbers are to be used for naming corresponding components, so that the previous description applies in this respect.

Figure 11:
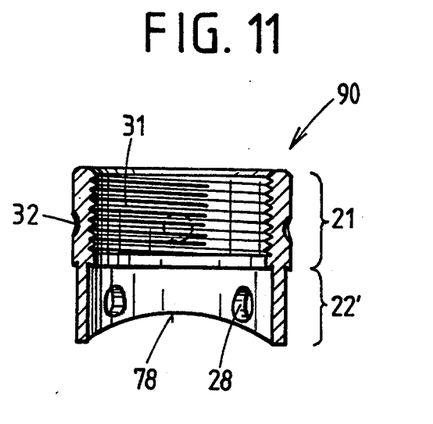
Figure 14:
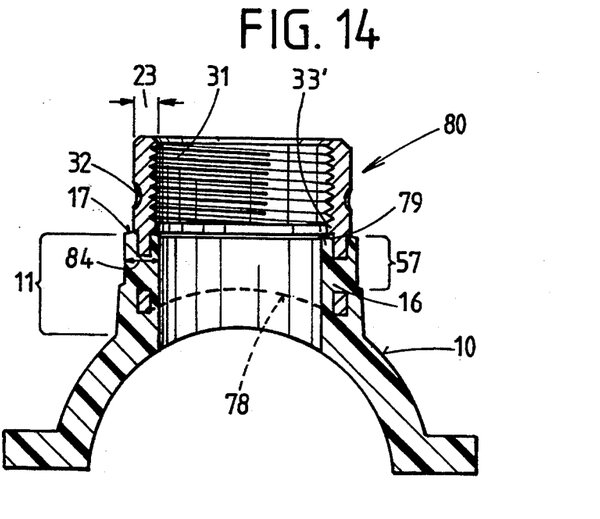
FIG. 14 shows, in a representation corresponding to that of FIG. 4, the upper region of an embodiment of the inventive pipe clamp, which has been modified further and has only one simple pipe socket.
Figure 15:
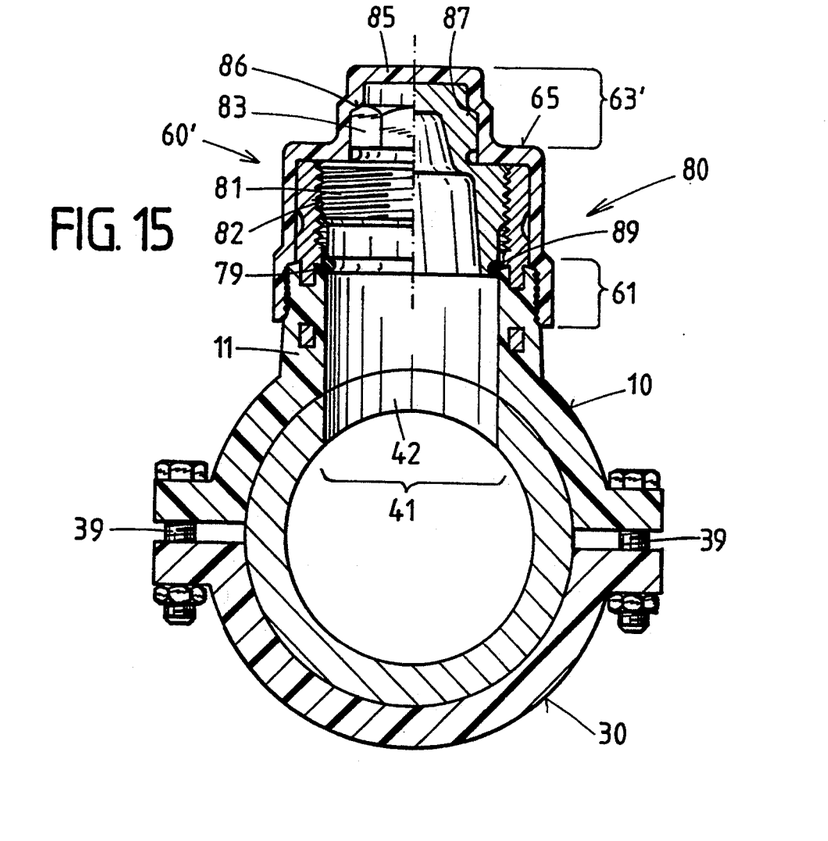
FIG. 15 shows, in a view corresponding to that of FIG. 14, the complete pipe clamp with the construction shown in FIG. 14.

In the case of the first embodiment of the tapping clamp 80 of FIG. 15, a lower shell 30 and an upper shell 10 are admittedly seated at the relevant position 41 of a supply pipeline 40. However, the pipe socket 11 is directly on the upper shell 10, as can be seen from FIG. 14. The special metal insert 90, which can be seen in FIG. 11, is integrated in the plastic 16. Said metal insert 90 has the head section 21, which has already been described in connection with FIGS. 1 to 7, but, in contrast with this, is provided with a shorter foot section 22'. The foot section 22' has a curved lower edge 78, which takes into consideration the later curvature of the upper shell 10 and the course of which is indicated in FIG. 14. Moreover, the already described radial openings 28 are also provided in the foot section 22'. During the injection molding process, plastic 16 flows through said radial openings 28 in the region of the pipe socket 11. Said radial openings 28 therefore lead to the already described intimate connection with the metal insert. In the embodiment of FIGS. 11, 14 and 15, the head section 21 of the metal insert 90 is provided with the already described coupling mountings 32 for functional parts, which can be put on, such as tapping equipment, transfer tubes, etc.

FIG. 15 shows a final possibility for using this tapping clamp 80 in conjunction with a plug 8, which can be screwed into the internal thread 31. Previously, the borehole 42 has been cut into the supply pipeline 40 using tapping equipment. By these means, it was possible to find access to the interior of the supply pipeline 40 in order to seal said pipeline 40, if necessary, by means of the already mentioned bubble seating equipment or plunger. The plug 88 is intended to close off finally the borehole 42 in the interior of the seated tapping clamp 80. For this purpose, the plug 81 is screwed in with its external thread 82 until, in the region of the head section 21, it comes up against the internal collar 33', which is illustrated in FIGS. 11 and 14 and limits the internal thread 31 there. Such an internal collar 33' is also provided in the case of the first embodiment of FIGS. 1 and 4. The plug 81 is handled by a hexagonal handle 83, which is integrally molded to its end face and corresponds in position and shape to the handle 58 of the valve element 50 described in the first embodiment. In the screw-in position described in FIG. 15, a sealing ring 89, positioned in a circumferential groove of the plug 81, comes to lie against that internal shoulder 79 of the pipe socket 11, which comes about due to the internal shoulder surface recognizable in FIG. 14. Said shoulder surface 79 arises because the wall thickness 84 of the pipe socket 11 of FIG. 14 is greater than the wall thickness 23 of the head section 21. This internal shoulder 79 thus remains as a shoulder in the region of the upper front end of the pipe socket 11 and is, moreover, also provided in a similar manner for the first embodiment of FIG. 4.

Figure 13:
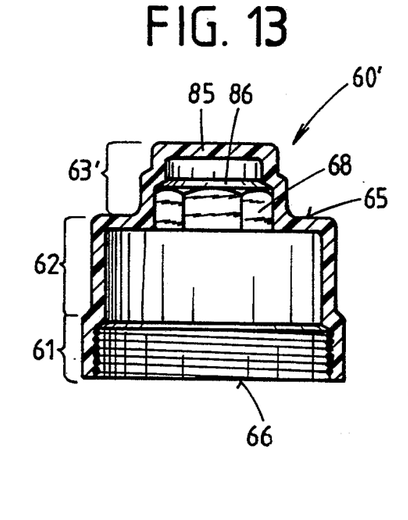
FIG. 13 shows, in a representation corresponding to that of FIG. 5, a longitudinal section through a modified embodiment a covering cap.

After the plug 81 has been screwed into the tapping clamp 80, the user can subsequently encase the tapping clamp 80, as has already been described in connection with the valve tapping clamp 77 of FIG. 7. In the present case, a covering cap 60' is used, which is analogous to that of the embodiment of FIG. 5, the appearance of which is illustrated in the longitudinal of FIG. 13 and the use of which is demonstrated in FIG. 15. Because of the analogous structure, the reference numbers used for the covering cap 60' are the same as those already used for the covering hood 60 of the first embodiment, which has already been described in connection with FIG. 5. For this reason, the previous description applies and it is sufficient to deal only with the differences.

Starting out from its cap opening 66, the covering cap 60' comprises first of all the already described cap edge zone 61, which can be welded on and which is followed by a cap middle zone 62 enclosing the axially projecting head section 21. Also over a step 65, said cap middle zone 62 changes over into a cap cone 63', which is axially shorter than that of the first embodiment. In the region of the first step 65, a noncircular seat 68, which also has a negative nut profile, is formed once again in the interior of the cap cone 63'. In the apical region of said cap cone 63', there is now, however, a closed cap bottom 85.

In the case of the assembly shown in FIG. 15, if the covering cap 60' has been permanently welded with its cap edge zone 61 to the offset circumferential region 57 of the pipe socket 11, which can be seen in FIG. 14, its offset step 65 grips behind the edge region about the central hexagonal handle 83. The associated cap cone 63' is itself stepped in proportion to the height of this hexagonal handle 83 and produces an internal shoulder 86, which can be seen in FIG. 13 and is braced at a complementary circumferential step 87 at the upper front end of the hexagonal handle 83. The cap bottom 85 covers the upper front surface at the offset handle 83.

Figure 12:
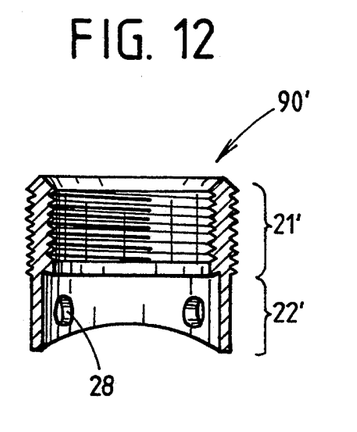
Figure 16:
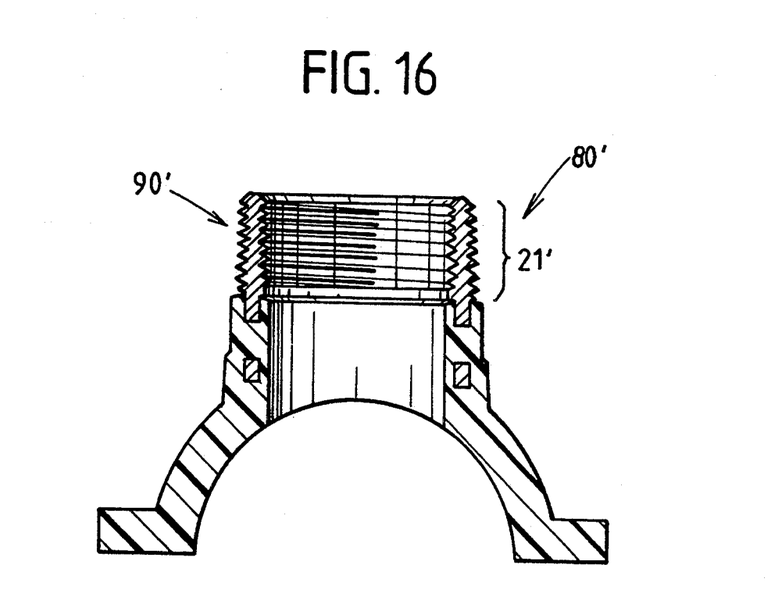
FIG. 16 shows a construction of the upper region of the pipe clamp, which is an alternative to that of FIG. 14, with the two-membered metal insert modified as in FIG. 12.

In a representation similar to that of FIG. 14, FIG. 16 shows the second embodiment of such a tapping clamp 80', which has already been mentioned above. This is designed essentially similarly to the previously described tapping clamp 80 and the previous description therefore applies. The difference consists only therein that, instead of the metal insert 90 shown in FIG. 11, the alternative construction 90' of FIG. 12 is used. Admittedly, the foot region 22' is provided analogously with a ring of radial openings 28. However, the head section 21' now has a construction, similar to that already described in conjunction with FIG. 8 for the valve tapping clamp 77' there. The head section 21' of the metal insert 90' has at its peripheral surface an external thread 70, which serves for connecting functional parts. In the finished tapping clamp 80' of FIG. 16, the metal insert 90' protrudes axially with its head section 21' in the manner already described repeatedly and is therefore accessible for convenient handling.

LIST OF REFERENCE NUMBERS

10 Upper shell of 77 to 77" or 80, 80'
11 Pipe socket of 12 or at 10
12 T-piece pipe of 10
13 Pipe junction of 12
14 Central borehole in 12
15 Inner surface of shell of 10
16 Plastic of 12, 11
17 Free front end of 11
18 Edge flange
19 Heat conductor, heat spiral
20 Tubular metal insert for 77 (FIGS. 1 to 4)
20' Tubular metal insert for 77' (FIG. 8)
20" Tubular metal insert for 77" (FIG. 9)
21 Upper axial section of 20, head section
21' Head section of 20'
21" Head section of 20"
22 Lower axial section, foot section of 20 to 20"
22" Foot section of 90, 90' (FIG. 11, 12)
23 Thick wall thickness of 21
24 Thin wall thinness of 22
25 Upper axial zone for 28
26 Lower axial zone for 28
27 Back-cut shoulder between 21, 22
28 Radial openings in 22, 22'
29 Radial opening in 21
30 Lower shell of 77 to 77"; 80, 80'
31 Internal thread of 21 to 21"
32 Radial coupling seat in 21
33 Lower internal collar of 22
33' Upper internal collar of 21
34 Inner end of 22
35 Height distance of 28 in 25, 26
36 Internal cone of 33
37 Valve seat at 33
38 Edge flange of 30
39 Tightening screws
40 Plastic supply pipeline
41 Fastening site for 77
42 Borehole at 41 in 43
43 Pipeline wall of 40
44 Coupling sleeve at 13
45 Cylinder end of 10
46 Electrical contact site for 47 or 48
47 First pipeline end of 19
48 Second pipeline end of 19
49 Spiral coils of 19
50 Valve element (FIG. 7)
51 Valve upper part of 50 or 72
52 Valve spindle at 50 or 72
53 Valve disk of 50 or 72
54 Valve shaft of 50 or 77
55 Rotating handle at 52
56 Heat conductor, heat coil in 44
57 Offset circumferential region of 11
58 Hexagonal handle of 51
59 Sealing ring in 69
60 Covering cap of 50 or 72
60' Covering cap for 81
61 Cap edge zone of 60 or 60'

62 Cap middle zone of 60 or 60'
63 Cap cone of 60
63' Cap cone of 60'
64 Axial opening, orifice opening
65 Step at 60 or 60'
66 Lower cap opening of 60 or 60'
67 Heating coil in 61
68 Noncircular seat in 60 or 60', negative nut profile
69 Terminal orifice at 60
70 External thread of 21'
71 Smooth peripheral surface of 21"
72 Valve tapping element (FIG. 10)
73 Lower disk seal of 53 (FIG. 10)
74 Milling cutter at 53 of 72
75 Upper disk seal of 53 (FIG. 10)
76 Internal thread of 51 at 72 (FIG. 10)
77 Valve tapping clamp (FIGS. 4, 6 and 7)
77' Valve tapping clamp (FIG. 8)
77" Valve tapping clamp (FIG. 9)
78 Lower edge of 22' (FIG. 11 )
79 Internal shoulder of 11
80 Tapping clamp (FIGS. 14, 15)
80' Tapping clamp (FIG. 16)
81 Plug for 80, 80'
82 External thread of 81
83 Hexagonal rotating handle of 81
84 Pipe socket thickness of 11 (FIG. 14)
85 Cap bottom of 60' (FIGS. 13, 15)
86 Internal shoulder of 63' (FIGS. 13, 15)
87 Circumferential steps at 83
88 Sealing ring at 51 (FIG. 7)
89 Sealing ring at 81 (FIG. 15)
90 Metal insert for 80 (FIGS. 11, 14, 15)
90' Metal insert for 80' (FIG. 16)

I claim:

1. A pipe clamp, particularly a tapping claim for tapping and closing off plastic supply pipelines for any one of gaseous and aqueous material under pressure
having an upper clamp upper shell of plastic, which has a one-piece pipe socket, and can be welded to the desired position of a supply pipeline,
and having a one-piece coaxial, tubular metal insert of the pipe socket, which has connection elements, such as an internal thread accessible from the interior of the pipeline, for connecting various functional tapping elements, wherein
the one-piece metal insert is organized in two axial sections of different shape, including a head section having the connecting elements for the functional tapping elements and a foot section adjacent to the head section and being free of such connecting elements,
wherein only the foot section is embedded in the midst of the pipe wall of the pipe socket in the plastic material and forms a reinforcing sleeve for the pipe socket,
while the head section protrudes freely from the front end of the pipe socket for positioning the connection elements outside of the pipe socket to allow the various tapping elements to be attached thereto.

2. The pipe clamp of claim 1, wherein the head section of the metal insert has a wall thickness, which is thicker than that of the foot piece and, at the transition to the foot section, forms a back-cut shoulder, which sits on the free front end of the pipe socket.

3. The pipe clamp of claim 1, wherein the foot section has radial openings, which are disposed preferably in a common axial zone and are infiltrated by the plastic of the pipe socket.

4. The pipe clamp of claim 1, wherein the foot section has radial projections pointing in one of an inwardly and outwardly direction.

5. The pipe clamp of claim 4, wherein an annular internal collar, formed by the radial projection, is located at the inner end of the foot section and is embedded in the plastic of the valve tapping clamp.

6. The pipe clamp of claim 1, wherein the pipe clamp has a T-piece pipe, which is formed in one piece with the pipe socket and has a lateral pipe junction for forming a branch to a house connection pipeline, which can be connected thereto.

7. The pipe clamp of claim 6, wherein the pipe junction has a coupling sleeve with an electrical heat conductor for making a welded connection to an inserted pipe end of the weldable, plastic house connection pipeline.

8. The pipe clamp of claim 5, wherein the radial inner collar of the foot section reinforces the ring zone in the interior of the T-piece pipe serving as valve seat.

9. The pipe clamp of claim 1, wherein the internal surface of the clamp upper shell facing the supply pipeline has at least one electrical heat conductor, which connects the tapping clamp to the supply pipeline by welding.

10. The pipe clamp of claim 9, wherein two pipeline ends of the heat spiral of the heat conductor run radially to the outgoing central pipe socket and the T-piece pipe in the clamp upper shell and end in two electrical junctions for connecting electrical welding equipment, said junctions being on either side of the pipe socket or the T-piece pipe at mutually opposite cylindrical end regions of the upper shell.

11. The pipe clamp of claim 1, wherein when encapsulating the functional tapping elements mounted in the pipe clamp, a covering cap of plastic is assigned to the pipe clamp, which encases either one of the head section protruding axially at the front end of the pipe socket and the T-piece pipe, grips with its cap edge zone surrounding the cap opening of either the adjoining circumferential region of said pipe socket and said T-piece pipe and can be welded thereon.

12. The pipe clamp of claim 11, is provided with an electrical heat conductor, which connects the covering cap to the pipe claim by welding.

13. The pipe clamp of claim 11 wherein the covering cap, which is predominantly rotationally symmetrical, is constructed section-wise in steps, comprising the cap edge zone with a large clear width, opposed by a radially offset cap middle zone in the region of the head section of the pipe clamp and, finally, a cap cone lying in front of the upper end surface of this head section.

14. The pipe clamp of claim 13, wherein the cap cone is closed, optionally has an axial profile bent at right angles and is braced at least in places on a functional tapping element, such as a plug, which is seated in the head section of the pipe clamp.

15. The pipe clamp of claim 13, wherein the covering cap has in its apical region an axial opening and produces a terminal orifice having an opening which, in the event of an installation, serves as a leadthrough for the operating end of the functional tapping elements connected in the head section such as the rotating handle of a valve element.

16. The pipe clamp of claim 15, wherein a sealing ring, which lies against led-through operating end of a functional tapping element so as to form a seal, is seated in the profiled opening of the cap cone.

17. The pipe clamp of claim 11, wherein the covering cap has in the interior of the cap a noncircular seat for a hexagonal handle at the operating end of a screwed-in functional tapping element.

* * * * *

UNITED STATES PATENT AND TRADEMARK OFFICE
CERTIFICATE OF CORRECTION

PATENT NO. : 5,348,045

DATED : September 20, 1994

INVENTOR(S) : Klaus SERVE

It is certified that error appears in the above-identified patent and that said Letters Patent is hereby corrected as shown below:

In the cover page, at Section [22], delete:

"Feb. 15, 1992" and substitute therefor --Feb. 12, 1993--.

Signed and Sealed this

Twenty-seventh Day of December, 1994

Attest:

BRUCE LEHMAN

*Attesting Officer*  *Commissioner of Patents and Trademarks*